(12) United States Patent
Tremp et al.

(10) Patent No.: US 11,713,269 B2
(45) Date of Patent: Aug. 1, 2023

(54) HOT-FORMING DEVICE FOR PRODUCING GLASS CONTAINERS FROM GLASS TUBES

(71) Applicant: SCHOTT Schweiz AG, St. Gallen (CH)

(72) Inventors: Marcel Tremp, Speicher (CH); Johannes Segner, Kassel (DE)

(73) Assignee: SCHOTT PHARMA SCHWEIZ AG, St. Gallen (CH)

( * ) Notice: Subject to any disclaimer, the term of this patent is extended or adjusted under 35 U.S.C. 154(b) by 204 days.

(21) Appl. No.: 16/938,220

(22) Filed: Jul. 24, 2020

(65) Prior Publication Data

US 2020/0354252 A1    Nov. 12, 2020

Related U.S. Application Data

(63) Continuation of application No. PCT/EP2019/051802, filed on Jan. 24, 2019.

(30) Foreign Application Priority Data

Jan. 26, 2018    (DE) .................. 10 2018 101 842.8

(51) Int. Cl.
  *C03B 9/38* (2006.01)
  *C03B 23/11* (2006.01)
  *C03B 23/045* (2006.01)

(52) U.S. Cl.
  CPC .......... *C03B 9/3816* (2013.01); *C03B 23/045* (2013.01); *C03B 23/112* (2013.01)

(58) Field of Classification Search
  CPC .......................... C03B 23/045; C03B 23/112
  See application file for complete search history.

(56) References Cited

U.S. PATENT DOCUMENTS 1,471,608 A * 10/1923 Irwin ................ C03B 11/02
                                                    65/319
2,405,557 A *  8/1946 Bonnefoy-Cudraz ...............
                                                    C03B 9/195
                                                    65/355

(Continued)

FOREIGN PATENT DOCUMENTS

CH        211080         8/1940
CN     1887754 A *       1/2007 ............ C03B 11/02
(Continued)

OTHER PUBLICATIONS

International Search Report dated May 6, 2019 for International Application No. PCT/EP2019/051802.
(Continued)

*Primary Examiner* — Galen H Hauth
*Assistant Examiner* — Steven S Lee
(74) *Attorney, Agent, or Firm* — Ruggiero McAllister & McMahon LLC (57) ABSTRACT

A hot-forming device is provided for producing glass containers from a glass tube. The device includes a rotary table mounted so as to be rotationally movable and an assigned drive motor for driving the rotary table. The rotary table includes several holding chucks for holding workpieces distributed around the circumference of the rotary table. The rotary table has a coolant channel that is fluid-tight and through which a coolant can flow to cool.

17 Claims, 8 Drawing Sheets

(56) References Cited

U.S. PATENT DOCUMENTS

| | | | | |
|---|---|---|---|---|
| 2,811,815 | A | * | 11/1957 | Eldred ............... C03B 7/16 65/319 |
| 3,113,010 | A | | 12/1963 | Willis |
| 3,125,429 | A | * | 3/1964 | Lauck ............... C03B 40/027 65/262 |
| 3,198,617 | A | * | 8/1965 | Mumford ............ C03B 11/02 65/225 |
| 3,630,707 | A | * | 12/1971 | Ayers ............. G05D 23/1919 65/319 |
| 4,184,865 | A | * | 1/1980 | Liebal ............... B30B 15/064 65/319 |
| 4,555,258 | A | * | 11/1985 | Curiel ............... C03B 11/127 65/319 |
| 5,300,134 | A | * | 4/1994 | Mannl ............... C03B 23/112 65/282 |
| 5,685,888 | A | * | 11/1997 | Tijerina-Ramos ...... C03B 9/195 65/237 |
| 6,442,976 | B1 | * | 9/2002 | Flynn ............... C03B 9/3875 65/83 |
| 9,409,808 | B2 | * | 8/2016 | Moseler ............ C03B 9/3816 |
| 2014/0373574 | A1 | | 12/2014 | Moseler |
| 2019/0263707 | A1 | | 8/2019 | Frost |

FOREIGN PATENT DOCUMENTS

| | | | | |
|---|---|---|---|---|
| CN | 103839765 | | 6/2014 | |
| CN | 105271658 | | 1/2016 | |
| CN | 105271658 | A * | 1/2016 | ........... B30B 15/007 |
| CN | 103839765 | B * | 4/2016 | |
| DE | 202004004560 | | 7/2004 | |
| DE | 10341300 | | 1/2005 | |
| EP | 2165983 | | 3/2010 | |
| EP | 2818454 | | 12/2014 | |
| GB | 526613 | | 9/1940 | |
| JP | H05170461 | A * | 7/1993 | ............. C03B 11/08 |
| JP | 09188531 | A * | 7/1997 | .......... B30B 15/007 |
| JP | 11255524 | A * | 9/1999 | ............. C03B 11/02 |
| JP | H11255524 | | 9/1999 | |
| JP | 2004115328 | A * | 4/2004 | ............. C03B 11/02 |
| JP | 3922756 | B2 * | 5/2007 | ............. C03B 11/02 |
| KR | 20170131126 | A * | 11/2017 | ............. C03B 23/00 |
| NO | 134944 | B * | 10/1976 | ........... C03B 9/3866 |
| WO | WO-2004048283 | A1 * | 6/2004 | ............. B23B 31/18 |
| WO | 2004057647 | | 7/2004 | |
| WO | WO-2004057647 | A1 * | 7/2004 | ............. C03B 23/07 |
| WO | 2005092805 | | 10/2005 | |
| WO | WO-2005092805 | A1 * | 10/2005 | ........... C03B 23/095 |
| WO | 2018091234 | | 5/2018 | |

OTHER PUBLICATIONS

English translation of the Written Opinion of the International Searching Authority dated May 6, 2019 for International Application No. PCT/EP2019/051802, 4 pages.

International Preliminary Report on Patentability dated Jul. 28, 2020 for International Application No. PCT/EP2019/051802, with English translation, 10 pages.

* cited by examiner

HOT-FORMING DEVICE FOR PRODUCING GLASS CONTAINERS FROM GLASS TUBES

CROSS REFERENCE TO RELATED APPLICATIONS

This application is a continuation of International Application PCT/EP2019/051802 filed Jan. 24, 2019, which claims the benefit of German application 10 2018 101 842.8 dated Jan. 26, 2018, the entire content of both of which are expressly included herein by way of reference.

BACKGROUND

1. Field of the Invention

The present invention in general concerns a device for producing glass containers, and in particular concerns a hot-forming device for producing glass containers from a glass tube, in particular for use as primary packing means for pharmaceutical active substances, for example as vials, cartridges or syringe bodies.

2. Description of Related Art

Such a hot-forming device is known from DE 103 41 300 B3 and, like the hot-forming device according to the present invention, serves for producing glass containers from a glass tube, in particular for use as primary packing means for pharmaceutical active substances, for example as vials, cartridges or syringe bodies.

Such a vertically oriented hot-forming device typically has at least two rotary tables which are rotated in steps about an assigned rotary tower in order to pass through a series of processing stations up to machining and hot-forming. Several holding chucks are distributed about the circumference of the rotary tables for holding workpieces, i.e. glass tube portions. Tools and a plurality of gas burners for forming are arranged on the work plate of the hot-forming device. In working mode, the rotary towers pivot from work position to work position and are synchronized on handover from the main to the secondary tower for product handover.

Similar hot-forming devices of the above-mentioned type are disclosed in DE 20 2004 004 560 U1, WO 2005/092805 A1 and EP 2 818 454 A1.

According to EP 2 818 454 A1, in the production of glass containers by hot-forming, the so-called delamination tendency, i.e. the enrichment of boron and other elements or compounds inside the glass containers, should be reduced. For this, a gas is blown into the still hot cavity of a glass container during hot forming. Compressed air channels are formed in the rotary table of the device for supplying gas to the holding chucks for the glass containers. A gap seal is provided for transferring the gas to the channel system of the rotary table, but this cannot perfectly seal the gap, which is acceptable for compressed air. The compressed air for blowing gases out of the glass containers during hot-forming has no or only a negligible cooling effect on the rotary table.

The gas burners normally used for hot forming lead to a considerable heat input into the system. In order to be able to produce glass containers while observing very tight tolerances and with consistent properties, the receivers of the workpieces to be machined must be arranged very precisely relative to the machining tools or elements of the hot-forming device. This requires operation of the hot-forming device in thermal equilibrium, wherein the machining tools or elements of the hot-forming device are or can be oriented precisely to the receivers of the workpieces only in permanent operating state. Even relatively slight temperature fluctuations can result in a considerable fluctuation of dimensions in the hot-forming device, for example the diameter of the rotary table, and hence the product quality. In the hot-forming devices currently used, this means that after run-up, the plant cannot be used for production of glass containers until thermal equilibrium has been reached. This unused period may be of the order of half an hour up to several hours. Actual production can only begin after achieving thermal equilibrium, which limits the production yield.

Similar problems exist if the process parameters of the plant are changed, for example if production conditions must be changed from production of one type of glass container to production of another type of glass container with different process parameters, or if the ongoing operation of a plant must be interrupted for maintenance or repair purposes, in particular to remove broken glass from the plant.

WO 2005/092805 A1 for example proposes compensating for the deviating position of the glass tube or container pre-product from the reference position at which the machining tool is positioned, in that the machining tools are arranged movably in the table plane on a cross table.

WO 2004/057647 A1 discloses a device for production of glass flasks by blow molding at both ends of a glass tube. Blow molding takes place in retaining chucks attached to a rotary table mounted in rotationally movable fashion. A coolant channel is formed in each holding chuck, through which coolant flows for cooling in order to protect the rotary bearings or the lubricant in the rotary bearings of the holding chuck from overheating. The coolant is supplied from a coolant container which is attached to the upper end of the rotary table and rotates together with the rotary table. This cooling structure is comparatively complex.

In view of the further rising requirements for product quality of glass containers for use as primary packing means for pharmaceutical active substances, there is therefore further need for improvement.

SUMMARY

It is an object of the present invention to provide an improved hot-forming device for producing glass containers from glass tubes, with which glass containers can be produced reliably and efficiently with consistently high quality and with very high cycle rates.

According to the present invention, a hot-forming device for producing glass containers from a glass tube is provided, with a rotary table mounted so as to be rotationally movable, and an assigned drive motor for driving the rotary table, wherein several holding chucks for holding workpieces are distributed around the circumference of the rotary table.

According to the invention, in the rotary table, a coolant channel is formed which is fluid-tight and through which a coolant can flow for cooling the rotary table. According to the present invention, either gases or cooling liquids may be used for cooling, so that heat can be efficiently extracted from the comparatively high thermal mass of the rotary table. Because the workpieces to be machined (glass tube or semifinished intermediate product which requires further processing by means of hot forming) are held on the rotary table, temperature fluctuations in this area have a significant effect on the distances from and orientation relative to the machining tools or elements of the hot-forming device, and therefore on the precision during further processing including hot forming of the glass tubes. Because of the cooling which takes place according to the invention in targeted fashion in this region, preferably by means of a cooling liquid, a thermally stable operation of the hot-forming device can be achieved even shortly following run-up or temporary stoppage of the hot-forming device, and changes in process parameters do not affect the properties of the hot-forming device which influence the quality of the glass containers to be produced. Thus according to the invention, the production yield and operating run-time can be significantly increased.

By suitable design of the coolant channel, this can easily be adapted individually to different geometries and thermal conditions of the rotary table. For this, a fluid-tight design of the coolant channels and their suitably fluid-tight connection to inlets and outlets for the coolant used must be ensured. The rotary table may in particular comprise a platform-like holding plate or rotating rim, wherein several holding chucks for holding workpieces to be machined are distributed around and attached to the circumferential edge of said plate or rim, wherein according to the invention, coolant can flow through the platform-like holding plate or rotating rim in order to ensure stable thermal conditions in this region.

According to a further embodiment, the coolant channel is configured meandering at least in portions, so that the coolant flows through the coolant channel in meandering form. In this way, in an advantageously simple fashion, the cooling effect from the coolant can be homogenized over a large area of the rotary table. At the same time, thereby the quantity of coolant necessary for appropriate cooling can be reduced. The meandering course furthermore serves to ensure a maximal contact surface between coolant and rotary table, and hence to increase the heat quantity which can be extracted. This homogenization takes place in particular by heat conduction in the component itself, in particular in portions between adjacent part portions of the coolant channel in which the coolant flows in opposite directions.

According to a further embodiment, the meanders of the coolant channel may extend radially up to between the holding chucks, in order also to cool regions in the immediate vicinity of the holding chucks. Because the holding chucks hold the heated glass tubes onto which the gas burners are directed for heating, the heat input in these regions is comparatively large.

According to a further embodiment, along the circumference of the rotary table, several part portions, preferably two to eight part portions, are formed with coolant channels which are connected fluid-tightly and in parallel to a common inlet distribution channel and a common outlet distribution channel. By connecting these part portions in parallel, a further homogenization of the thermal conditions is achieved, including in the circumferential direction of the rotary table.

According to a further embodiment, the distribution channels for the coolant are configured as circumferential channels in a common main body which are separated from each other via a separating wall. An inner distribution channel may be provided with a smaller diameter and an outer distribution channel with a larger diameter, wherein the inner distribution channel, viewed in the axial direction of the main body, is worked more deeply into the main body than the outer distribution channel. Here, connections for supplying coolant to the coolant channels of the part portions are connected fluid-tightly to the distribution channels via radial bores, wherein the radial bores are offset in the axial direction of the main body. In this way, said part portions can easily be supplied with coolant, in particular a cooling liquid, from common coolant distribution channels.

According to a further embodiment, the coolant channel formed meandering at least in portions is provided in a vertical portion of the rotary table. Thus for example in targeted fashion, portions of the rotary table may be cooled which contain bearings or parts of the drive motor which are sensitive to temperature fluctuations.

According to a further embodiment, the coolant channel formed meandering at least in portions is additionally or alternatively provided in a horizontal portion of the rotary table. In this way, in particular the regions of the holding chucks for holding workpieces, which are normally provided on the horizontal portion of the rotary table, can be cooled in targeted fashion so that, because of a reduction in temperature fluctuations, an even higher positional accuracy of the holding chucks can be achieved. For this, the coolant channel formed meandering at least in portions may be provided in the horizontal portion of the rotary table in regions between two adjacent holding chucks.

According to a further embodiment, the rotary table is mounted so as to be rotationally movable on a carrier which is arranged fixedly on a work table of the hot-forming device and extends perpendicularly to the work table, wherein a coolant distributor or rotary distributor is arranged on the carrier above the rotary table and connects a stationary supply and discharge line, for supplying and discharging coolant via connecting lines, fluid-tightly to the rotary table mounted rotationally movably. Whereas conventionally, the carrier as a rotating column was arranged so as to rotate on a work table of the hot-forming device, the coolant supply can be simplified by the arrangement of a rotationally fixed carrier, in particular a rotationally fixed column, on the work table. In particular, there is no need to arrange a coolant reservoir, which is normally relatively large and heavy, at the upper end of the rotary table. Rather, for supply with coolant according to the invention, it is sufficient to couple a stationary supply and discharge line fluid-tightly with supply hoses which co-rotate with the rotary table.

According to a further embodiment, said carrier is configured as a column with circular cross-section which extends perpendicularly to the work table. Such a column is even better adapted to the geometry of the assigned rotary table so that in particular, distances between the column and the rotary table or holding chucks provided thereon can be even further reduced, which advantageously increases the stiffness of the entire structure and hence allows even greater precision in the production of glass containers.

According to a further embodiment, the rotary table has an upper coolant channel running in an upper region of the rotary table, and a lower coolant channel running in a lower region of the rotary table. By means of the configuration of these coolant channels, in targeted fashion then different thermal conditions of the rotary table can be taken into account. Thus the coolant channels may for example be configured such that the cooling effect is greater in the lower region, in which typically the heat input is higher, than in the upper region of the rotary table. In general, dividing the rotary table into several part portions with coolant channels allows the formation of several cooling zones, so that the cooling power can be adapted individually to the different thermal conditions in the cooling zones, by changing for example the cooling area (form of coolant channels), the throughflow quantity of coolant or the run-up temperature.

According to a further embodiment, along the circumference of the rotary table, several part portions are formed with upper coolant channels which run in an upper region of the rotary table, and with lower coolant channels which run in a lower region of the rotary table, preferably two to eight part portions. The inlets and outlets of these part portions for supplying the lower coolant channels and the upper coolant channels are connected together fluid-tightly via connecting lines such that, in the circumferential direction of the rotary table, the several part portions are formed with coolant channels, wherein the part portions are connected in parallel via the connecting lines. In this way, a further homogenization of the thermal conditions can easily be guaranteed, even in the circumferential direction of the rotary table.

According to a further embodiment, the rotary table is formed in two or more parts, with a first main body which in particular forms an upper (or also lower) region of the rotary table and with a second main body which in particular forms a lower (or also upper) region of the rotary table, wherein the two main bodies are connected together in rotationally rigid fashion. In this way, for example, a functional separation can be achieved between the two main bodies. Thus for example a drive motor may be received in the lower (or upper) region, or lower (or upper) main body, of the rotary table, such that it is arranged in a stable thermal environment because of cooling. Or, by targeted cooling of the lower (or upper) region, the heat input in this region can be compensated and stable thermal conditions ensured in this region. Thus even more stable thermal conditions can be achieved in the region of the rotary table, even at high cycle rates of the rotary table and with the associated high heat input because of gas burners.

According to a further embodiment, the drive motor is configured as a direct drive so that the respective rotary table is connected to the assigned column directly and without interposition of a gear mechanism. To minimize play, the direct drive is arranged as close as possible to the actual machining plane in which the glass tube or semifinished intermediate product is positioned during its machining and hot forming. Quite particularly preferably, the direct drive is arranged above a work plate on which the respective carriers or columns are arranged, because in this way the distance between the direct drive or rotary bearing assigned to the direct drive and the actual machining plane can be minimized, which results in a reduced play, lower wear and hence a higher machining accuracy. Because of the resulting efficient dissipation of waste heat, a higher heat input (which is associated with very high cycle rates of the hot-forming device) has no disadvantageous influence on the thermal conditions in the region of the rotary table.

According to a further embodiment, the respective direct drive comprises a torque motor with a high number of pole pairs, for example at least twenty-two pole pairs. A torque motor can be regarded in simple terms as a large servomotor with a hollow shaft, which is optimized for high torque. Torque motors are usually brushless direct current motors, but in some case switched reluctance motors are also known as torque motors. In other words, a torque motor in the sense of the present invention is a drive which is frequently also described as a slow running or high-moment drive. Torque motors in the sense of the present invention may be configured with external rotor (stator inside, rotor outside) or conventionally with internal rotor (rotor inside, stator outside). External rotors can provide a greater torque for the same installation size.

A torque motor is distinguished in particular by a higher torque which results above all from the relatively high number of pole pairs and the resulting short travel distances for the magnetic circuit, leading to low conductor losses and a low ratio of mass to torque. Also, torque motors can easily be produced with a relatively large diameter. The high drive moment of torque motors allows high accelerations and high dynamics of the system. Torque motors have a higher drive stiffness than gear motor units according to the prior art, and no torsional backlash. In particular, they also allow better control properties due to lower disturbance variables and higher repeat accuracy. Due to the absence of mechanical elements, torque motors require little maintenance and produce little noise. Practically no wear occurs in a torque motor.

According to a further embodiment, a stator of the respective torque motor is arranged in the upper region of the assigned carrier, in particular the assigned column. Thus the distance between the torque motor and the actual machining region can advantageously be reduced, which allows a higher machining accuracy.

According to a further embodiment, the assigned carrier, in particular the assigned column, is arranged fixedly or rotationally rigidly on or above a work table. The structure may therefore be designed to be sufficiently dynamically rigid to absorb the drive forces prevailing on pivoting of the rotary table.

According to a further embodiment, the rotary bearing is arranged in the above-mentioned cooled region at a short distance from a working plane between the glass tube—or semifinished intermediate product after separation of the glass tube—and a machining tool. Because of the cooling, consistent thermal conditions can be ensured even in the region of the rotary bearing.

According to a further embodiment, furthermore at least one temperature sensor is provided for detecting a temperature of the rotary table or of the coolant flowing through the rotary table, wherein an assigned control circuit is designed for maintaining a constant temperature of the rotary table or regulating a volume flow of the coolant flowing through the rotary table in suitable fashion by adjusting an actuator. For example, the actuator may vary the volume flow of the coolant in suitable fashion, for example by changing a flow cross-section. For this, in particular, suitable actuating valves may be used.

According to a preferred further embodiment, the above-mentioned cooling is provided exclusively in the region of the rotary table of the so-called parent machine, as will be explained in more detail below. In principle, said cooling may however also be provided in the region of the rotary table of a so-called bottoming machine used to form the base of the glass containers, as will be explained in more detail below. In general, the cooling concept described above may be used on any carousel machines for production of glass containers from glass tubes by hot-forming. Carousel machines in the sense of the present invention may in principle have only a single rotary table, but may also have two rotary tables or more than two rotary tables.

According to a further embodiment, the hot-forming device has two rotary tables, wherein the rotary tables execute rotary movements in steps about the assigned columns with a constant cycle rate, wherein the movement tracks of the first rotary table and second rotary table intersect at a point at which a workpiece is transferred from a holding chuck of the first rotary table to a holding chuck of the second rotary table, wherein machining tools and gas burners are arranged at discrete working positions along the movement tracks of the first and second rotary tables, for machining and hot-forming the glass containers.

BRIEF DESCRIPTION OF THE DRAWINGS

The invention is explained as an example below with reference to the enclosed drawings which reveal further features, advantages and objects to be achieved. The drawings show.

In the figures, identical reference signs designate identical elements or element groups or those with substantially the same function.

DETAILED DESCRIPTION

Figure 1:
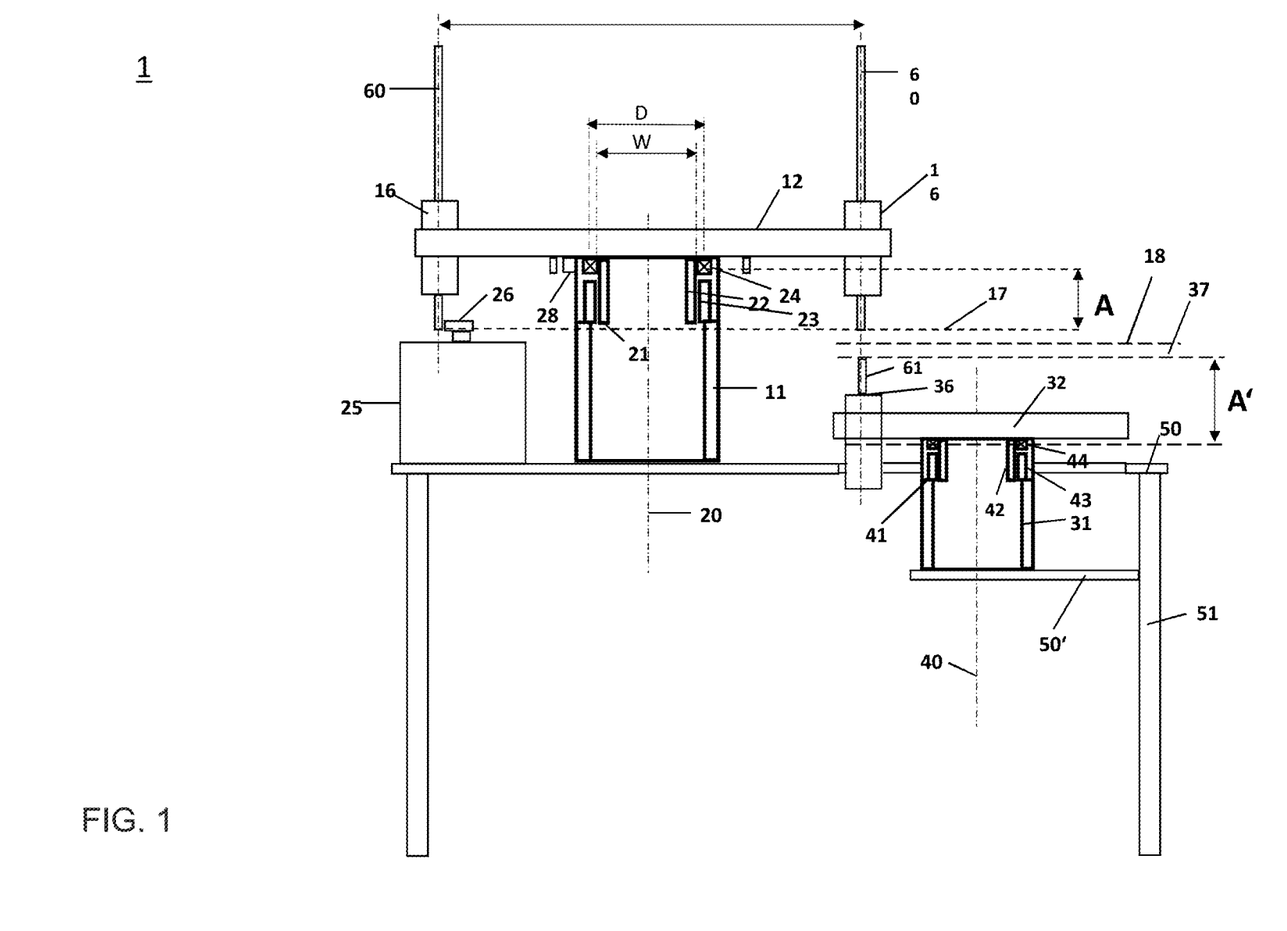
FIG. 1 the fundamental structure of a hot-forming device according to the present invention in a diagrammatic, side sectional view.
Figure 2:
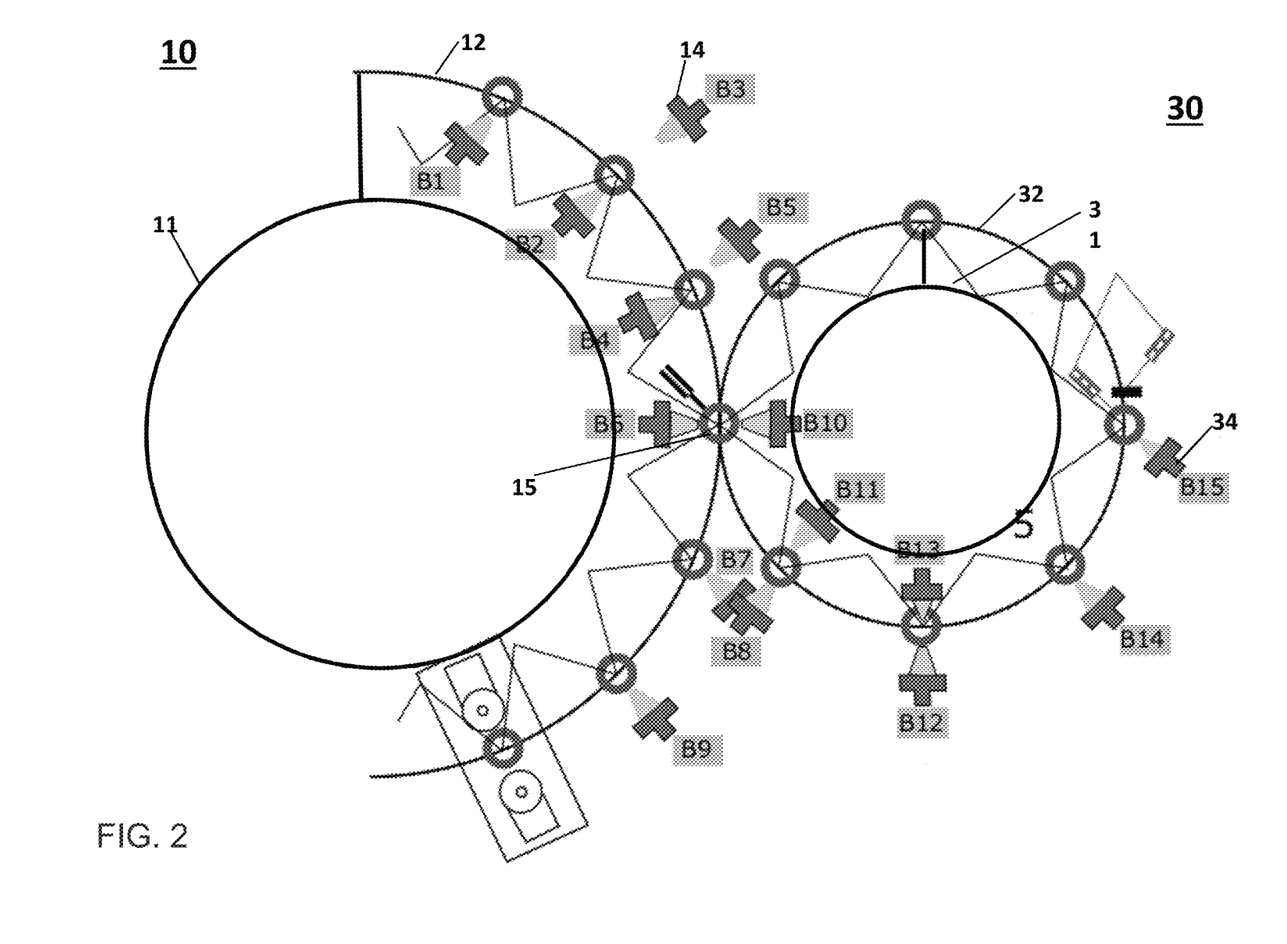
FIG. 2 in a diagrammatic top view, parts of the hot-forming device according to FIG. 1.

The hot-forming device 1 shown in FIGS. 1 and 2 serves for production of glass containers from a glass tube 60 which is supplied from above with vertical orientation. The glass containers to be produced—for example vials, cartridges or syringe bodies—serve to store pharmaceutical active substances. The hot-forming device 1 here comprises a so-called parent machine 10 which in particular serves for hot-forming of the supplied glass tube 60 at an end opposite the later bottom or open end of the glass container, and a so-called bottoming machine 30 arranged downstream of the parent machine 10 and in particular serving to form the bottom or open end of the glass container. The supplied glass tubes 60 or semifinished intermediate products are held at a suitable machining height in holding chucks 16, 36 which are distributed around the circumference of the rotary table 12, 32. Holding chucks 16, 36 are provided on the rotary tables 12, 32 for holding glass tubes 60 or semifinished intermediate products 61. The rotary tables 12, 32 are mounted so as to be rotationally movable on the assigned columns 11, 31. The rotary tables 12, 32 are rotated or pivoted in steps around the assigned columns 11, 31. The glass tubes 60 or semifinished intermediate products 61 held in the holding chucks 16, 36 move in steps past various machining stations B1 . . . B15 at which, during a respective stoppage time, they are machined and hot-formed into glass containers. These machining stations B1 . . . B15 comprise in particular machining tools 26 for machining, and heating devices e.g. gas burners 14, 34. The depicted number of machining stations B1 . . . B15 is merely exemplary and does not restrict the invention. As FIG. 2 shows, the movement tracks of the first rotary table 12 and second rotary table 32 intersect at a handover position 15 at which a workpiece 60 is handed over from a holding chuck 16 of the first rotary table 12 to a holding chuck 36 of the second rotary table 32. Further details of such a structure may be taken for example from EP 2 818 454 A1 or PCT/EP2017/077114 with application date Oct. 24, 2017 by the applicant, the contents of which are expressly included herein by way of reference.

The two columns 11, 31 are arranged fixedly or rotationally rigidly on the top side of a work plate 50, 50' which stands on a frame 51. The lower ends of the columns 11, 31 do not protrude beyond the underside of the respective assigned work plate 50, 50'.

Direct drives 21, 41, which drive the rotary movement of the columns 11, 31, are arranged inside the columns 11, 31. More precisely, the direct drives 21, 41 are each preferably arranged in the region of the upper end of the respective column 11, 31. In the embodiment shown, the direct drive is formed as a torque motor 21, 41 with a high number of pole pairs, for example at least twenty pole pairs, preferably at least thirty pole pairs. According to FIG. 1, the two torque motors 21, 41 each comprise an internal rotor 22, 42 configured as a cylindrical or polyhedral extension which protrudes vertically from the underside of the respective rotary table 12, 32 and extends into the upper region of the assigned column 11, 31. An assigned stator 23, 43 lies directly opposite the rotor 22, 42, forming a narrow air gap. The stator 23, 43 is arranged in the region of the upper end of the respective column 11, 31 and preferably arranged running in a circumferential recess (not shown) in the upper region of the assigned column 11, 31. A rotary bearing 24, 44 for rotary mounting of the rotary table 12, 32 at the assigned column 11, 31 is situated a short distance above the respective stator 23, 43.

Because the respective rotor 22, 42 is arranged directly on the assigned rotary table 12, 32, the torque is transmitted via only few components with low moved mass and maximal stiffness of construction, which according to the invention allows very high cycle rates.

The glass tubes 60 are introduced initially vertically from above into the holding chucks 16 in an insertion region of the parent machine 10, and then clamped at a suitable height level by the holding chucks 16 so that the lower end of the respective glass tube 60 is arranged on a working plane 17 in which various machining stations B1 . . . B9 are distributed along the movement track of the first rotary table 12 (more precisely, FIG. 2 shows only some of these machining stations).

In the case of production of vials, at the handover position 15 (see FIG. 4), the glass tube portions 60 have already been formed into filling openings ready for use with a constricted neck portion and a wider shoulder portion. Then at handover position 15, these glass tubes portions 60 are transferred to the downstream bottoming machine 30 in which the bottoms of the glass vials are formed further at the subsequent machining stations B10 . . . B15.

As evident from FIG. 1, the rotary bearings 24, 44 are arranged at a slight or negligible distance A, A' from the working plane 17, 38 between the glass tube 60 (or semifinished intermediate product 61 after separation from the glass tube 60) and a machining tool 26, or on the separating plane 18 between the glass tube 60 and semifinished intermediate product 61 separated therefrom, which in conjunction with the comparatively high stiffness of the structure, allows a high machining precision. Suitably, said distance A, A' is of the order of an axial length of the glass container to be produced, preferably less than this axial length. The short distance A, A' prevents additional positioning errors due to angular axis deviations between the glass tube 60 and the tool 26, or between the glass tube 60 and the semifinished intermediate product 61.

As FIG. 1 shows, on the underside of the first rotary table 12 is a sensor 28 for determining a rotary position of the first rotary table 12. A corresponding sensor (not shown) may also be arranged on the underside of the second rotary table 32 for determining a rotary position of the second rotary table 32. Thus in the region of the respective rotary bearing 24, 44, the angular motion of the respective rotary table 12, 32 can be measured with high resolution.

In contrast to the prior art, with the above-mentioned drive system, the frequency of pivoting from one position to the next is not limited because of too great a mass to be rotated (gear mechanism, column and rotary table) and the resulting mechanical load on the gear mechanism (accelerations and braking for positioning). Gear mechanisms which lead to a play between the components (e.g. gear wheels or mechanical curves and rollers) are not necessary in the drive train according to the invention, which leads to a longer service life of the rotary bearing because of the lower loading, and also improves the angular positioning accuracy parallel to the work table. Because the action site of the tools on the glass tube or semifinished intermediate product lies on a relatively large diameter (because of many clamping chucks) but the diameter of the rotary bearing in the drive concept according to the invention can be selected relatively large, in contrast to the prior art these errors do not multiply further, which leads to a higher quality of the end product.

The mounting of the direct drive motor can be integrated in the column with comparatively large diameter. Because the integrated bearing is arranged above the work table, the height difference between the mounting and the point of attack of the tools, or the handover of the semifinished intermediate product from the parent machine to the bottoming machine, is small or even negligible, which results in a higher stiffness of the drive arrangement and greater precision in machining or hot-forming. As explained in more detail below, according to the invention the mounting and drive motor regions may be cooled.

Figures 3A, 3B:
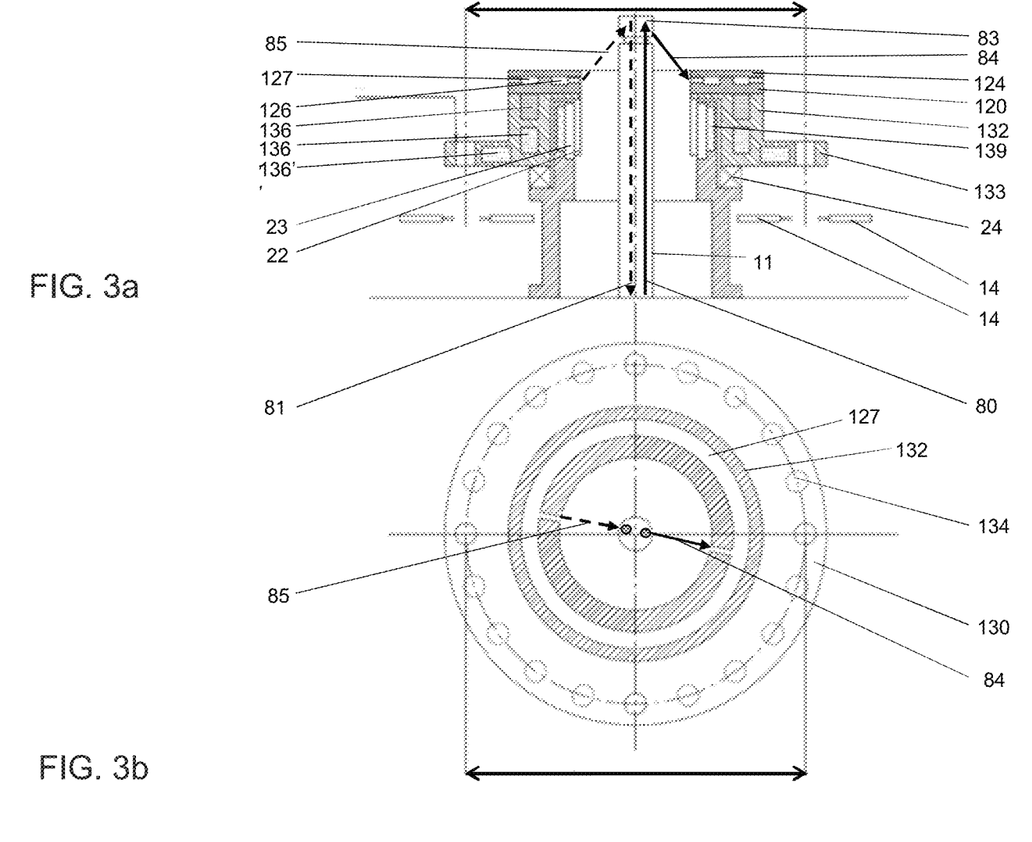
FIGS. 3a and 3b in a partial section and a diagrammatic top view, the mounting of the rotary table of the hot-forming device in FIG. 1 on a rotationally fixed column (for example for a parent machine)

FIGS. 3a and 3b show, in a partial section and a top view for a parent machine, the mounting of the rotary table 12 according to FIG. 1 on a rotationally fixed column 11. In principle, a comparable mounting may also be implemented for a bottoming machine.

According to FIG. 3a, the rotary table is composed of an upper main body 120 and a lower main body 130 which are connected together rotationally rigidly, e.g. bolted together, but in principle could also be formed integrally, for example produced by an adaptive production method.

Figure 4:
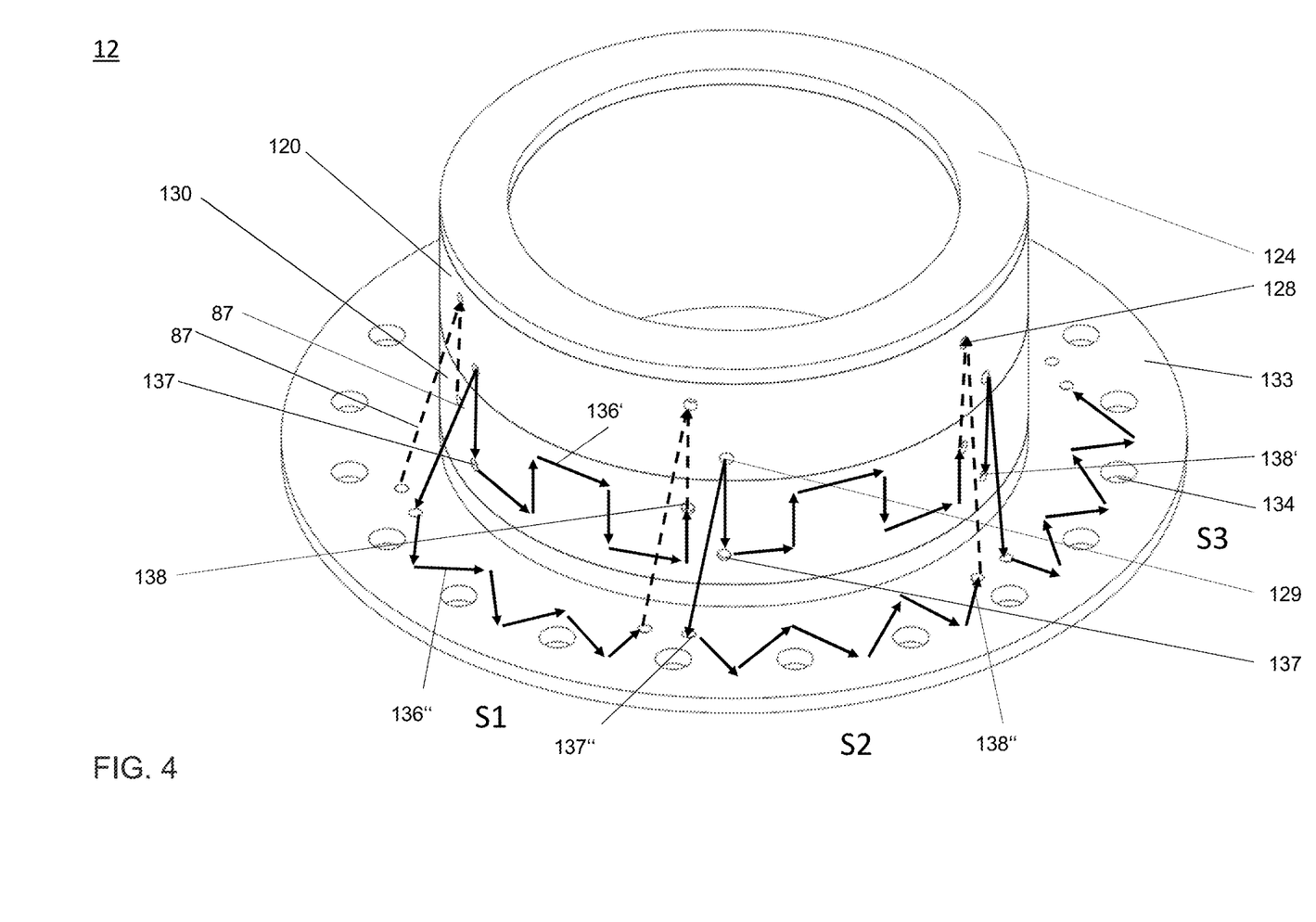
FIG. 4 in a diagrammatic, perspective view, a rotary table with a diagrammatic depiction of coolant channels according to the present disclosure.

The lower main body 130 is shown more clearly in FIG. 4 and comprises a cylindrical region 132 which is mounted at the assigned column, and at the lower end a plate-like region 133 in which the holding chucks are attached in recesses 134 at even angular distances from each other for holding the workpiece to be processed.

Coolant channels 136' are formed in the sleeve 132, wherein coolant, preferably a cooling liquid, flows through said channels to cool the lower main body 130. The coolant channels 136' in the lower main body 130 extend in the circumferential direction and are configured as meanders, whereby the thermal conditions can be further homogenized over the entire sleeve 132. Furthermore, coolant channels 136" are formed in the plate-like region 133 which also have a meandering course, whereby the thermal conditions can also be homogenized in the plate-like region 133 and hence in the immediate vicinity of the holding chucks (not shown). As FIG. 4 shows, the lower main body 130 is divided into several part portions S1, S2, S3 . . . , in each of which a coolant channel 136', 136" with meandering course is formed. The coolant channels 136', 136" of the part portions S are connected in parallel and to this end are connected via connecting lines 87 to a common inlet distribution channel 126 and a common outlet distribution channel 127, which according to FIG. 3a are formed in the upper main body 120 and are described below in more detail with reference to FIG. 5.

As FIG. 4 shows, inlets 137' and outlets 138' are provided at several positions on the sleeve 132 and connected fluid-tightly via the connecting lines 87 to the outlets 129 or inlets 128 respectively of the upper main body 120; via these, coolant—in particular a cooling liquid—can flow from the upper main body 120 into the coolant channels 136', 136" of the lower main body 130 or flow back out of the coolant channels 136', 136", as will be explained below. By connecting the coolant channels 136', 136" of the part portions S of the lower main body 130 in parallel, the thermal conditions in the lower main body 130 are also homogenized in its circumferential direction.

In general, the lower main body 130 may be divided into several components to form horizontally running and/or vertically running coolant channels. The line contour of the coolant channels may then be worked individually in each component in order to ensure suitable thermal conditions. For this, line contours with meandering form are preferred.

As FIG. 4 shows, the coolant channels 136" extend in the plate-like region 133 up to portions between adjacent recesses 134 in order also to cool these regions in the immediate vicinity of the holding chucks in targeted fashion.

Figure 5:
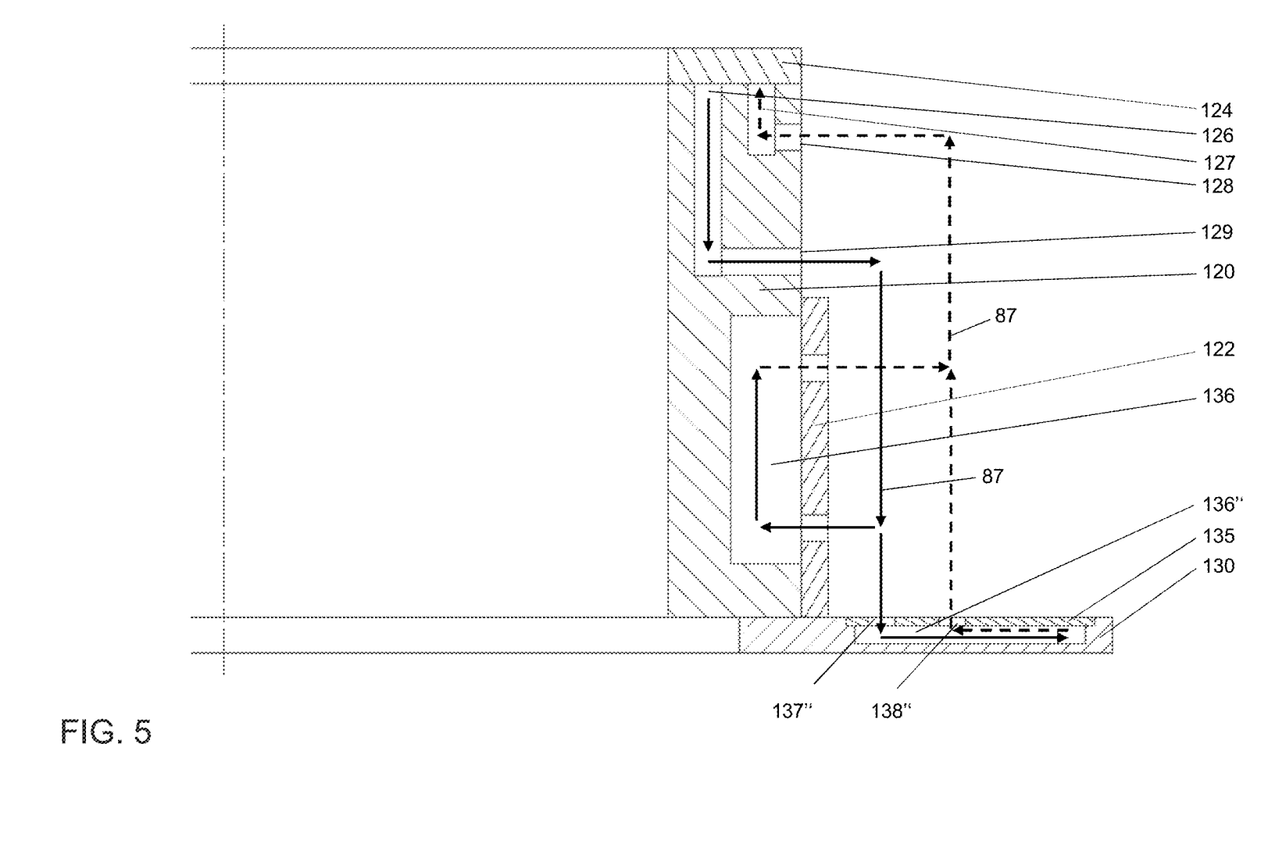
FIG. 5 in a diagrammatic, partial section, the arrangement of coolant distribution channels and coolant channels in a rotary table according to the present disclosure.

FIG. 5 shows further details of the distribution channels 126, 127 which are formed at the upper end of the upper main body 120. More precisely, an inner distribution channel 126 with smaller diameter and an outer distribution channel 127 with larger diameter are each formed as circumferential grooves on the upper end of the upper main body 120. The inner distribution channel 126 is formed more deeply than the outer distribution channel 127. From the outside of the upper main body 120, radial bores 128, 129 extend up to the respective distribution channel 126, 127 in order to serve as inlet or outlet for the distribution channels 126, 127. The radial bores 128, 129 are formed offset in the axial direction of the upper main body 120 according to the respective depths of the distribution channels 126, 127. The outlet 129 of the inner distribution channel 126 is connected to an inlet 137" of the coolant channel 136" via a connecting line 87. The inlet 128 of the outer distribution channel 127 is connected to an outlet 138" of the coolant channel 136" via a connecting line 87. These connections are configured accordingly for all part portions S (see FIG. 4) of the rotary table in order to implement a parallel circuit of these part portions.

According to FIG. 5, in this exemplary embodiment, in the lower region of the cylindrical portion of the upper main body 120, furthermore at least one coolant channel 136' is formed which preferably also has the meandering course shown in FIG. 4. Preferably, this lower region is also divided in the circumferential direction into several part portions which are supplied accordingly with coolant, in particular with a cooling liquid, via branches of the connecting lines 87.

FIG. 5 furthermore shows a preferred principle for formation of the coolant channels in regions of a rotary table. At the upper end of the upper main body, the distribution channels 126, 127 are covered and sealed by an annular cover. Accordingly, the molded contour of the distribution channels 126, 127 is formed in a first part, namely at the upper end of the upper main body 120, wherein a second part or several second parts, namely the annular upper cover 124, form a cover for covering the molded contour of the distribution channels 126, 127. Accordingly, the coolant channels 136' are formed on the outer circumference at the lower end of the upper main body 120, wherein a second part or several second parts, namely the cylindrical cover 122, form a cover for covering the molded contour of the coolant channels 136'. The two parts are connected to each other in sealed fashion.

Figure 6A:
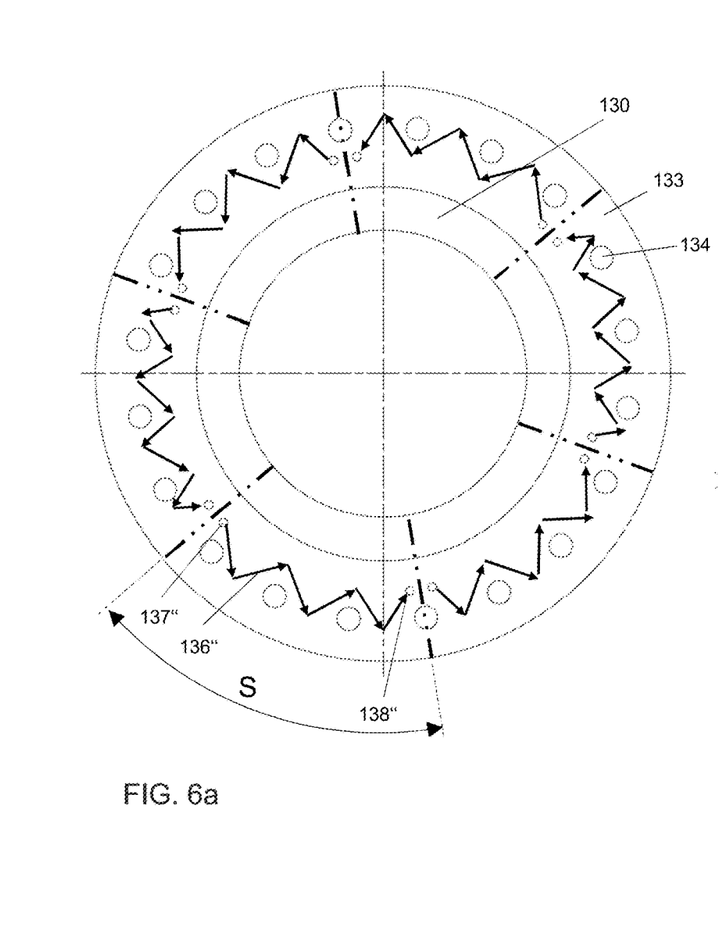
FIGS. 6a and 6b in a diagrammatic top view and a side view, the rotary table of a hot-forming device according to the present invention which is composed of a lower main body and an upper main body.
Figure 6B:
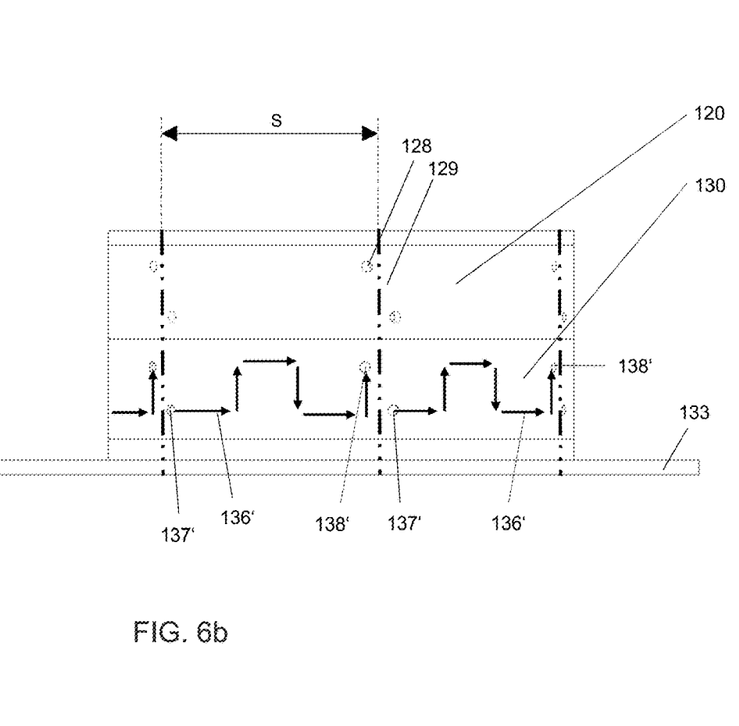
Figure 7A:
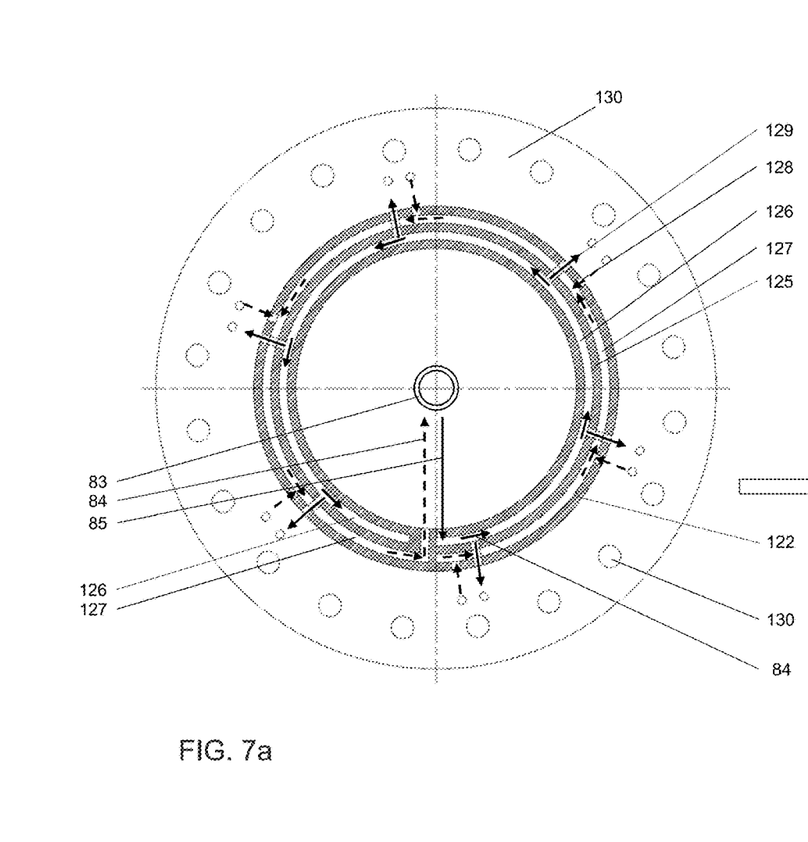
FIGS. 7a and 7b in a diagrammatic top view with partial section and a side view, the formation of coolant distribution channels and the connection of these coolant distribution channels to coolant channels in a rotary table according to the present disclosure.
Figure 7B:
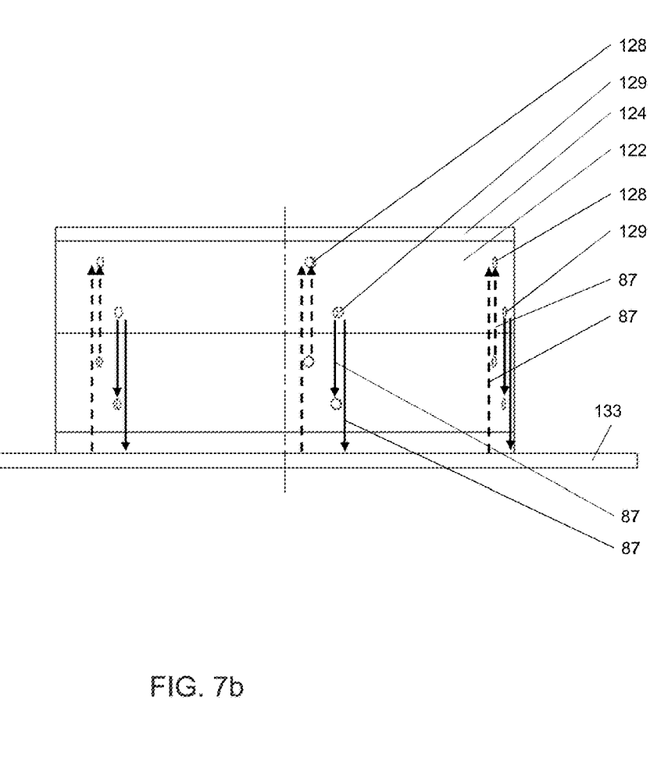

FIGS. 6a and 6b again show the rotary table from FIG. 4 in a diagrammatic top view and a diagrammatic side view, wherein the flow directions in the coolant channels 136', 136" are indicated by arrows. The arrows in FIG. 7a indicate the flow conditions in the distribution channels 126, 127 of the upper main body. The arrows in FIG. 7b indicate diagrammatically the flow directions in the connecting lines 87 which connect the distribution channels in the upper main body 120 to the coolant channels in the cylindrical portion of the lower main body 130 or in the rotating rim 133 of the lower main body 130.

As FIG. 3a shows, in the lower main body 130, a coolant channel 139 is arranged in the immediate vicinity of the stator 23 of the drive motor in order to allow optimal cooling of the stator 23. This coolant channel 139 may also have a meandering course, in particular in the vertical direction. As FIG. 3a shows, in the vertical portion of the lower main body 130, further coolant channels 136, 136' are provided which serve for cooling the vertical portion of the lower main body 130, in particular also the bearing 24. These coolant channels 136, 136' may have a meandering course, in particular in the vertical direction. As FIG. 3a shows, in the horizontal portion 133 of the lower main body 130, further coolant channels 136" are provided which serve for cooling the plate-like region 133 of the rotary table with the recesses 134 provided there for the holding chucks. These coolant channels 136" may also have a meandering course, in particular in the horizontal direction. In total, in this way, very constant thermal conditions are ensured in this dimensionally critical portion of the rotary table 12.

The supply of coolant to the rotary table 12 is indicated diagrammatically in FIGS. 3a and 3b. A coolant supply line 80 and a coolant discharge line 81 run in stationary positions in the hollow interior of the column 11. A connecting portion (rotary distributor head) 83 is provided at the upper end of the column 11; the connecting hoses 84, 85 for connection to coolant distribution channels 126, 127, which serve for further supply of the coolant channels 136, 136', 136" and 139, are coupled fluid-tightly to said connecting portion 83. The connecting portion (rotary distributor head) 83 is designed such that the connecting hoses 84, 85 can easily follow the rotary motion of the rotary table 12 even at high cycle rates, and the connection remains fluid-tight.

The cooling in the region of the rotary table 12, its mounting and its drive, is described below in more detail with reference to FIG. 3a.

The stator 23 and rotor 24 of the drive motor are arranged inside the lower rotary table. The stator 23 is surrounded by a coolant channel 139. The waste heat from the drive motor can thereby be efficiently dissipated from this region; the bearings 24 are also arranged in this region so that stable thermal conditions can also be guaranteed for the mounting of the rotary table 12 to the column 11. Via an infeed in the form of a circle segment and a corresponding discharge, the upper main body 120 supplies the cooling circuits 136, 136' and 136" in the lower main body 130 with coolant, which is suitably distributed over the individual cooling circuits 136, 136', 136" arranged around the circumference of the lower main body 130. Overall therefore, stable thermal conditions are ensured in the region of the rotary table 12. This also applies in the case of a change of process parameters in the hot-forming of glass tubes or semifinished intermediate products.

The cooling of the rotary table 12 (see FIG. 1) ensures consistent thermal conditions so that the holding chucks 16 in the working plane 17 are subject solely to slight positional fluctuations because of thermal expansion. Thus stable thermal conditions can prevail in the actual working plane 17, so that dimensional fluctuations, positional deviations etc. due to a fluctuating heat input etc. can be effectively prevented according to the invention. Thus the glass containers can be produced with a consistently high quality. The hot-forming device 1 may be used again for production of glass containers very quickly after run-up or stoppage.

The rotationally fixed column 11 and compact drive structure with cooling according to the present invention also allow in particular, in contrast to the prior art, operation of the gas burners 14 not pointing radially inwardly but pointing radially outwardly, as indicated diagrammatically in FIG. 3a. In this way, the heat input into the column 11 can be significantly reduced, which contributes very advantageously to the consistent thermal conditions in the region of the rotary table 12, including its mounting and drive. Both orientations of gas burners 14 are also conceivable as shown in FIG. 3a, whereby the temperature conditions in the region of the hot-forming may be predefined in an even more homogenous and efficient fashion.

Figure 8:
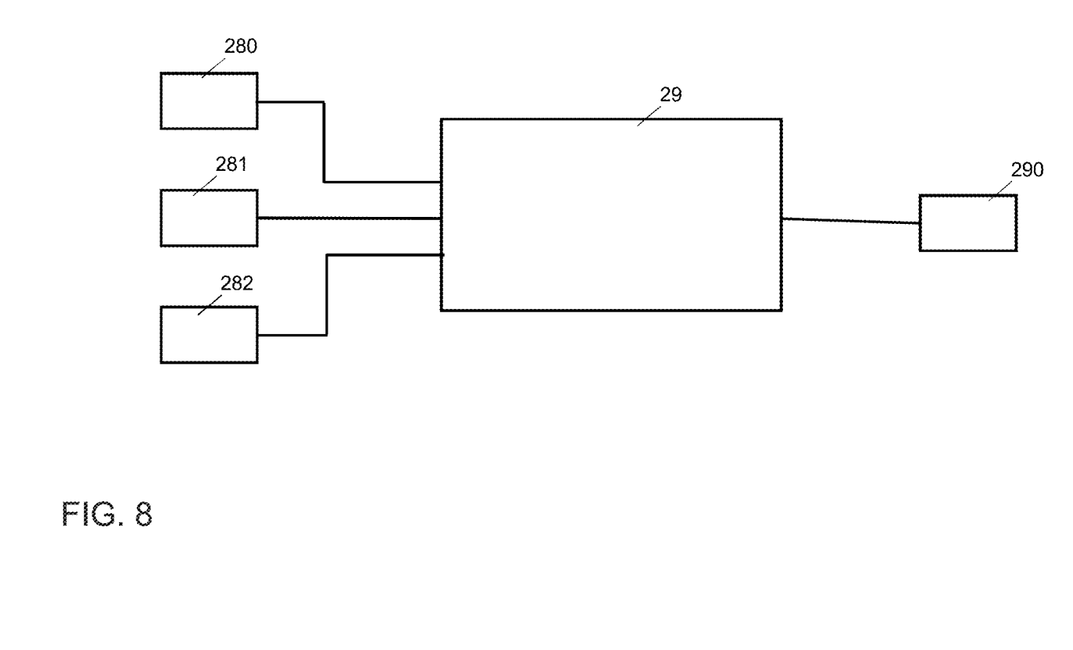
FIG. 8 in a diagrammatic depiction, a control circuit for regulating the temperature in a hot-forming device according to the present invention.

As FIG. 8 shows, for further homogenization of the thermal conditions, a temperature regulation may be used in the region of the rotary table 12 including its mounting and drive. For this, in the hot-forming device, several temperature sensors 280-282 may be arranged at suitable positions, for example for detecting a temperature of the rotary table or of the coolant flowing through the rotary table, or of the bearings or the column. The measured values of temperature sensors 280-282 are transmitted to a temperature control circuit 29 which adjusts an actuator 290, for example an actuating valve, in order to regulate the cooling effect of the coolant suitably and thus ensure even more stable temperature conditions. For example, the actuator 290 may vary the flow rate of the coolant suitably, for example by changing a flow cross-section or a volume flow, or by changing a run-up temperature.

As will be evident to the expert from studying the above description of the cooling concept according to the present description, the terms "top" and "bottom" in the present description serve merely to describe the mutual positional relationship of sub-portions of a rotary table, without thereby meaning the upper or lower position of the rotary table in actual operation. Rather, in comparison with the above description, the rotary table may also be mounted differently, i.e. with the lower portion at the top and the upper portion at the bottom. The holding chucks need not necessarily be attached to a lower portion of the rotary table but may also be attached to an upper or arbitrary middle portion of the rotary table. Furthermore, the coolant distribution channels described above need not necessarily be provided in an upper portion of the rotary table, but may also be provided in a lower or arbitrary middle portion of the rotary table.

Although the rotary table is described above with reference to FIGS. 1 and 2 as being mounted so as to be rotationally movable on a fixed column, the rotary table may evidently also be attached to rotating rotary columns as in a conventional carousel machine.

LIST OF REFERENCE SIGNS

| | | | |
|---|---|---|---|
| 1 | Hot-forming device | 25 | Holding and positioning block |
| 10 | Parent machine | 26 | Tool |
| 11 | Column | 28 | Sensor for determining a rotary position |
| 12 | Rotary table | 280, 281, 282 | Temperature sensor |
| 120 | Upper main body of rotary table 12 | 29 | Control circuit |
| 122 | Side wall | 290 | Actuator |
| 124 | Upper cover | 30 | Bottoming machine |
| 125 | Separating wall | 31 | Column |
| 126 | Inner coolant channel | 32 | Rotary table |
| 127 | Outer coolant channel | 34 | Gas burner |
| 128 | Inlet | 36 | Holding chuck |
| 129 | Outlet | 37 | Working plane |
| 130 | Lower main body of rotary table 12 | 40 | Rotary axis |
| 132 | Cylindrical region of rotary table (sleeve) | 41 | Torque motor |
| | | 42 | Rotor |
| 133 | Plate-like region of rotary table (holding flange) | 43 | Stator |
| | | 44 | Bearing |
| 134 | Recess for holding chuck | 50 | Work table |
| 135 | Cover of radial coolant channel | 50' | Additional holding plate |
| 136, 136', 136" | Coolant channel | 51 | Frame |
| 137, 137', 137" | Inlet | 60 | Glass tube/workpiece |
| 138, 138', 138" | Outlet | 61 | Intermediate product/workpiece |
| 139 | Coolant channel for stator | 80 | Coolant supply line |
| 14 | Gas burner | 81 | Coolant discharge line |
| 140 | Holder for gas burner 14 | 83 | Connecting portion for coolant supply (rotating), rotary passage |
| 15 | Handover region | | |
| 16 | Holding chuck | 84 | Connecting hose to coolant inlet |
| 17 | Working plane | 85 | Connecting hose to coolant outlet |
| 18 | Separating plane | 87 | Connecting hose |
| 20 | Rotation axis | A, A' | Distance of rotary bearing from working plane |
| 21 | Torque motor | | |
| 22 | Rotor | B1 ... B15 | Machining stations |
| 23 | Stator | D | Bearing diameter |
| 24 | Bearing | W | Active diameter |

What is claimed is:

1. A hot forming device for producing glass containers from a glass tube comprising:
   a rotary table mounted so as to be rotationally movable;
   an assigned drive motor configured and positioned to drive the rotary table; and
   a plurality of holding chucks configured and positioned to hold workpieces, the plurality of holding chucks being distributed around a circumference of the rotary table,
   wherein the rotary table includes a coolant channel that is fluid-tight and through which a coolant can flow to cool the rotary table,
   wherein the rotary table comprises a first main body that forms an upper region of the rotary table and with a second main body that forms a lower region of the rotary table, wherein the first and second main bodies are connected together in rotationally rigid fashion.

2. The hot-forming device of claim 1, wherein the coolant channel meanders, at least in portions, through the rotary table.

3. The hot-forming device of claim 2, wherein the coolant channel extends between the plurality of holding chucks.

4. The hot-forming device of claim 1, wherein the coolant channel comprises a common inlet distribution channel, a common outlet distribution channel, and a plurality of channel portions connected fluid-tightly and in parallel to the common inlet and outlet distribution channels, the plurality of channel portions being formed along the circumference of the rotary table.

5. The hot-forming device of claim 4, wherein the plurality of channel portions comprises two to eight channel portions.

6. The hot-forming device of claim 4, wherein the inlet and outlet distribution channels are circumferential channels in a common main body separated from each other via a separating wall.

7. The hot-forming device of claim 6, wherein the circumferential channels have different diameters, and wherein an inner distribution channel, viewed in an axial direction of the common main body, is worked more deeply into the common main body than an outer distribution channel.

8. The hot-forming device of claim 7, further comprising connections fluid-tightly to the common inlet and outlet distribution channels via radial bores are offset in an axial direction of the common main body.

9. The hot-forming device of claim 1, wherein the coolant channel is formed by two parts that are connected together and sealed fluid-tightly.

10. The hot-forming device of claim 9, wherein a first part of the two parts comprises a molded contour of the coolant channels and a second part of the two parts comprises a cover that covers the molded contour.

11. The hot-forming device of claim 1, further comprising:
   a carrier affixed to and extending perpendicularly to a work table, the rotary table is mounted to the carrier so as to be rotationally movable on the carrier; and
   a coolant distributor arranged on the carrier above the rotary table, the coolant distributor connects a stationary supply and discharge line, fluid-tightly to the rotary table.

12. The hot-forming device of claim 1, further comprising a rotating rotary column and a work table, the rotary table being mounted on the rotating rotary column, the rotating rotary column is mounted so as to be rotationally movable on the work table and is rotated about its axis by the assigned drive motor.

13. The hot-forming device of claim 1, wherein the coolant channel comprises upper coolant channels that run in the upper region of the rotary table and lower coolant channels that run in the lower region of the rotary table.

14. The hot-forming device of claim 1, wherein the coolant channel is a circumferential channel defined in the first main body.

15. The hot-forming device of claim 1, wherein the coolant channel is positioned and configured to remove heat from the rotary table in a region of the assigned drive motor.

16. The hot-forming device of claim 1, further comprising a rotary bearing mounting the rotary table in rotationally movable fashion, wherein the rotary bearing is arranged adjacent a portion of the rotary table through which the coolant flows.

17. The hot-forming device of claim 1, further comprising:
- a temperature sensor detecting a temperature of the rotary table and/or of the coolant flowing through the rotary table;
- an actuator controlling a coolant flow; and
- a control circuit communication with the temperature sensor and the actuator, the control circuit being configured to maintain the rotary table and/or the coolant at a constant temperature by adjustment of the actuator based on the temperature.

* * * * *